United States Patent [19]
Kubota

[11] Patent Number: 5,353,394
[45] Date of Patent: Oct. 4, 1994

[54] EDGE LIST CONSTRUCTOR FOR DIGITAL IMAGE PROCESSOR

[75] Inventor: Kazuhiro Kubota, Tokyo, Japan

[73] Assignee: NEC Corporation, Tokyo, Japan

[21] Appl. No.: 933,941

[22] Filed: Aug. 24, 1992

[30] Foreign Application Priority Data

Aug. 23, 1991 [JP] Japan .................................. 3-212258

[51] Int. Cl.$^5$ ............................................ G06F 15/20
[52] U.S. Cl. .................................................. 395/141
[58] Field of Search ............... 395/133, 134, 118, 121, 395/140, 141; 345/24, 189, 114, 118

[56] References Cited

U.S. PATENT DOCUMENTS 5,133,049  7/1992  Cain et al. ............................. 395/133
5,202,960  4/1993  Seiler ..................................... 395/143

*Primary Examiner*—Phu K. Nguyen
*Attorney, Agent, or Firm*—Foley & Lardner

[57] ABSTRACT

An edge list constructor is used for polygon processing. Suppose an m-polygon is formed by m segments ending at two adjacent vertex elements: (Xn, Yn) as the starting point and (Xn+1, Yn+1) as the terminating point. A coordinate point sequence {Xn, Yn} on the two-dimensional X-Y plane defines the above m-polygon (where m is a natural number of not less than 3, n is a natural number not more than m, Xm+1=X1, Ym+1=Y1). When, among the elements of this coordinate vertex sequence {Xn, Yn}, the greatest Y coordinate value is Ymax and the smallest Y coordinate is Ymin and K is an integer not less than Ymin but not more than Ymax, the value f(K), which is the number of intersections made by an edge of the above m-polygon and the horizontal straight line where Y=K, is determined. During the process where edge list elements serially generated are stored into a memory, an edge list element is stored at a location apart from the previous edge list element storage location for Y=K by f(K).

5 Claims, 15 Drawing Sheets

| (5,6,−) | } Y=6 | (5,6,−) | } Y=6 | (5,6,−) | } Y=6 |
|---|---|---|---|---|---|
|  |  |  |  | (5,6,+) |  |
| (6,5,−) | } Y=5 | (6,5,−) | } Y=5 | (6,5,−) | } Y=5 |
|  |  |  |  | (6,5,+) |  |
| (6,4,−) | } Y=4 | (6,4,−) | } Y=4 | (6,4,−) | } Y=4 |
|  |  |  |  | (6,4,+) |  |
|  | } Y=3 | (7,3,−) | } Y=3 | (7,3,−) | } Y=3 |
|  |  |  |  | (7,3,+) |  |
|  | } Y=2 | (6,2,−) | } Y=2 | (6,2,−) | } Y=2 |
|  |  |  |  | (6,2,+) |  |
|  | } Y=1 | (5,1,−) | } Y=1 | (5,1,−) | } Y=1 |
|  |  |  |  | (5,1,+) |  |
|  | } Y=0 | (4,0,+−) | } Y=0 | (4,0,−) | } Y=0 |
|  |  |  |  | (4,0,+) |  |

FIG.7

UNSORTED EDGE LIST

APPROXIMATE STRAIGHT LINE FROM (5,6) TO (7,3) · · · (5,6-) (6,5-) (6,4-)
APPROXIMATE STRAIGHT LINE FROM (7,3) TO (4,0) · · · (7,3-) (6,2-) (5,1-) (4,0-)
APPROXIMATE STRAIGHT LINE FROM (4,0) TO (5,6) · · · (4,0+) (4,1+) (4,2+) (5,3+)
(5,4+) (5,5+) (5,6+)

FIG.8

```
                    SORTED EDGE LIST
  Y=6  · · ·  (5,6,+)
  Y=5  · · ·  (5,5,+)   (6,5,-)
  Y=4  · · ·  (5,4,+)   (6,4,-)
  Y=3  · · ·  (5,3,+)   (7,3,-)
  Y=2  · · ·  (4,2,+)   (6,2,-)
  Y=1  · · ·  (4,1,+)   (5,1,-)
  Y=0  · · ·  (4,0,+)
```

FIG.9A

```
                    EDGE LIST CONSIDERING
                    MAXIMUM/MINIMUM POINT
  Y=6  · · ·  (5,6,+)   (5,6,-)
  Y=5  · · ·  (5,5,+)   (6,5,-)
  Y=4  · · ·  (5,4,+)   (6,4,-)
  Y=3  · · ·  (5,3,+)   (7,3,-)
  Y=2  · · ·  (4,2,+)   (6,2,-)
  Y=1  · · ·  (4,1,+)   (5,1,-)
  Y=0  · · ·  (4,0,+)   (4,0,-)
```

FIG.9B

```
                    EDGE LIST CONSIDERING
                    MAXIMUM/MINIMUM POINT
  Y=6  · · ·  (5,6,+)   (5,6,-)
  Y=5  · · ·  (5,5,+)   (6,5,-)
  Y=4  · · ·  (5,4,+)   (6,4,-)
  Y=3  · · ·  (5,3,+)   (7,3,-)
  Y=2  · · ·  (4,2,+)   (6,2,-)
  Y=1  · · ·  (4,1,+)   (5,1,-)
```

EDGE LIST CONSTRUCTOR FOR DIGITAL IMAGE PROCESSOR

BACKGROUNDS OF THE INVENTION

1. Field of the Invention

The present invention relates to an edge list constructor used in digital image processors, particularly in those with bit map display function for polygon drawing.

2. Description of the Prior Art

It is often required to fill an arbitrary closed area expressed on a two-dimensional X-Y plane with a certain pattern in some operations such as graphics display. The most typical application is to paint the inside of a polygon when coordinates of the polygon vertexes are given. If the polygon is under a certain limitation for its shape, it is easy to fill the inside. A certain limitation here means, for example, the one in a polygon shown in FIG. 16A. In general, a polygon refers to a single closed area as shown in FIG. 16A or 16B, but the description here also covers those with crossing edges, or those with more than one closed area. It is relatively easy to define the inside area of the polygons in FIG. 16A and 16B. However, to fill a polygon in FIG. 16C, whether a point with coordinates (X#, Y#) is located inside the polygon or not needs to be judged. Typical conditions currently used for such judgment include "Even-odd rule" and "Non-zero winding rule". These two rules are described below.

Suppose m is a natural number not less than 3 and n is another natural number not more than m. Further suppose an m-polygon defined by m segments having (Xn, Yn) and (Xn+1, Yn+1), which are two adjacent elements in a coordinate vertex sequence {Xn, Yn}, as starting point and the terminating point respectively, where Xm+1=X1, and Ym+1=Y1. If the sign component of the outer product of a standard straight line starting from a coordinate point (X#, Y#) and terminating at a coordinate point at infinity and an edge starting from said (Xn, Yn) and terminating at (Xn+1, Yn+1) is Wn, then the total sum W of Wn values relating to n (W=Wn) is the winding number relating to said coordinate point (X#, Y#). This winding number is used to judge whether the coordinate point (X#, Y#) is located inside of m-polygon.

Usually, either of two criteria is selected: "a coordinate point with odd winding number is deemed to be located inside" or "a coordinate point with a winding number other than 0 is deemed to be inside". The former is called "even odd rule" and the latter "Non-zero winding rule". Refer to FIGS. 17 and 18 for instinctive understanding of these rules. Suppose the defined area of X coordinate is Xmin<X. To determine the winding number of the coordinate point (X#, Y#), assume a standard segment ending at (X#, Y#) and (Xmin, Y#). When a horizontal segment (parallel to X axis) is thus selected as the standard straight line, the sign component Wn of the outer product can be easily obtained. Specifically, if there is an edge crossing this segment from $-Y$ area toward $+Y$ area, Wn=+1. If any edge crosses the segment from $+Y$ area toward $-Y$ area, Wn=$-1$. Accordingly, the winding number W of the coordinate point (X#, Y#) can be obtained by totaling Wn values from (Xmin, Y#) to (X#, Y#). FIG. 17 shows such a case. FIG. 18 shows an example of a polygon which most remarkably shows the difference between the even odd rule and non-zero winding rule. In FIG. 18, when {Xn, Yn} (n=1, 2, 3, 4, 5) is given, all of the areas 1 to 6 are filled according to non-zero winding rule, but only the areas 1 to 5 are filled leaving the area 6 according to the even odd rule. The even-odd rule and the non-zero winding rule have been described.

Next, a method to determine the winding number is specifically described.

The winding number can be determined by calculating the coordinates of intersections made by edges and the standard segment one by one. However, this intersection calculation processing requires division operations, resulting in low speed operation if processed by software; an expensive hardware will be required for higher speed operation. To solve this problem, various methods have been proposed taking advantage of space coherency (which means that winding numbers of adjacent coordinate points are often identical) or scan line coherency (when the winding number of the coordinate point (X#, Y#) is W, the winding numbers of the coordinate points (X#+1, Y#) and (X#−1, Y#) are often W, too). Here, referring to FIGS. 7, 8, 9A, 9B, 10A, 10B and 11, the order edge list algorithm on which the present invention is based is described.

FIG. 10A shows a triangle defined by three vertexes (4,0), (7,3) and (5,6). The three edges of the triangle are the ideal straight line drawn on the real number coordinate plane. When this triangle is mapped to integer coordinate plane, it becomes a triangle formed by three approximate lines as in FIG. 10B. One of the reasonable systems to promptly determine the coordinate values of the points constituting these approximate lines is a digital differential analyzer (DDA). Considering that edges of a polygon (approximate segments) are a set of points (hereinafter referred to as micro-points), DDA can be used to rapidly generate integer coordinates for such points. These micro-points are intersections of a horizontal straight line and an edge. For example, micro-point coordinate (5,4) in FIG. 10B is the coordinate of the intersection where an approximate segment ending at (4,0) and (5,6) crosses a horizontal straight line where Y=4. In other words, determination of micro-point coordinates using DDA is equivalent to determination of intersection points with the horizontal straight line.

FIG. 8 shows an edge list. The list contains intersections made by three approximate segments forming edges of the triangle in FIG. 10A and the horizontal straight line where Y=K (K=0, 1, 2, 3, 4, 5, 6) (i.e. the coordinates points shown as black circles in FIG. 10B) sorted by X and Y coordinate value. In addition, attribute data to indicate "+" or "−" is given to each intersection element. The attribute is "+" when the edge crosses the horizontal straight line upward from lower point, and "−" for reverse direction. This attribute data is used for increment or decrement in winding number calculation. Usually, an edge list for one horizontal straight line consists of even number of elements. If it has odd number of elements, it is inconsistent with the fact that the winding number of the coordinate point at infinity is zero.

However, the edge list for horizontal straight line where Y=6 which the vertex (5,6) as the maximum Y coordinate value belongs to consists of odd number of elements. Similarly, the edge list for the horizontal straight line where Y=4 which the minimum vertex (4,0) belongs to consists of odd number of elements. Accordingly, it is necessary to arrange the processing to allow two edge elements for a maximum or minimum point. FIG. 9A shows an edge list with such maximum and minimum value processing. This list has been modified so that it can have two equivalent values for the maximum and the minimum points. Alternatively, the list may have two edge elements for one maximum point and no edge element for one minimum point, for example. FIG. 9B shows an edge list subjected to such maximum/minimum processing.

The maximum/minimum processing can be solved in the process where approximate segments are generated by DDA. Edge list generation in FIG. 9A is described below. Generally, approximate straight lines are generated as if they trace the polygon edges in one direction along the edges. Taking the triangle in FIG. 10B as an example, an approximate straight line from (5,6) to (7,3) and that from (7,3) to (4,0) and that from (4,0) to (5,6) are generated in this order. Thus, if the terminating end of the approximate segment currently generated by DDA is the maximum or minimum point, the segment is generated up to the terminating point. If the terminating end of the approximate segment currently generated by DDA is not a maximum or minimum point, the segment is generated up to the point immediately before the terminating point. Thus, an edge list as in FIG. 9A can be constructed.

Finally, edge list in FIG. 9A or 9B is used for judgment whether a point is located inside of the polygon. When a horizontal straight line where Y=2 is taken for example, it has two elements: (4,2,+) and (6,2,−). This means that the winding number increases by 1 at the coordinate point where X=4 and decreases by 1 at a coordinate point (6,2). For the winding number at the intersection (4,2) and (6,2), certain rules can be introduced as boundary judgment conditions. The boundary judgment condition used here is: "if an intersection (X#, Y#) exists, the winding number changes at a position where (X#−0.5, Y#)". Accordingly, the winding number is 1 for the area 4<X<6, and 0 for the area where X<4 or 6<X.

When the winding numbers are determined based on FIG. 9A and the points inside of the triangle are filled, then the result is as shown in FIG. 11. The coordinate points with the winding number of 1 are filled.

In conventional ordered edge list algorithm as described above, if a polygon has some hundreds of vertexes, it takes a long time to sort the elements by X and Y coordinate values. The memory space is originally in one-dimensional disposition arranged by the address, which is only one parameter. On the other hand, an edge list is in two-dimensional array according to X and Y coordinates. There are two methods for rapid sorting when two-dimensionally arranged data are stored in one-dimensional space.

The first one is rearrangement of the memory space into a two-dimensional space. To minimize the number of coordinate points subjected to winding number judgment, the minimum circumscribing rectangle entirely enclosing the polygon (circumscribing rectangle hereinafter) is extracted so as to determine the winding number of coordinate points belonging to the internal area of the circumscribing rectangle only. FIGS. 15A and 15B show an example of such circumscribing rectangle. Circumscribing rectangle extraction is an effective means to decrease the data subjected to processing. To one coordinate point belonging to the inside of a circumscribing rectangle, an area to store the winding number of the coordinate point is assigned to the memory. In other words, the memory capacity assigned as the edge list storage area is determined uniformly depending on the size of the circumscribing rectangle. In a polygon as shown in FIG. 15B, memory efficiency is relatively high, but in a polygon as shown in FIG. 15A, efficiency is extremely low. Only 1% of the memory capacity actually assigned as the edge list storage area is used.

The second method is generation of coordinate values for the differential points forming the approximate segment from the side with larger Y values to lower values. Taking FIG. 10A as an example, by generating of the approximate straight line from (7,3) to (4,0) and that from (7,3) to (5,6) at a time, edge list elements are generated starting from those with larger Y values. In this method, however, the number of DDA systems required depends on the shape of the polygon. In an extreme case, DDA is required for the same number as the polygon edges. Thus, this is not a realistic method. Alternatively, one DDA can be used to generate two or more approximate straight lines. In this case, too, parameters DDA requires to generate straight lines must be pushed and popped between DDA and memory. Considering this overhead, this is not realistic, either.

Two methods have been described above. Memory capacity in former method and the number of DDA in the latter method are distinct problems. In short, conventional edge list storing systems have a drawback that they cannot rapidly construct an edge list when the polygon has increased vertexes.

SUMMARY OF THE INVENTION

An object of the present invention is to provide an edge list constructor for edge list generation capable of rapid determination of integer coordinate points belonging to the inside area from the coordinate vertex sequence of a polygon defined on the X-Y coordinate plane using a single segment generator and a small size memory, while eliminating the above drawback.

Another object of the present invention is to provide an edge list constructor which can store the edge list elements in the continuous areas so that the memory volume can be minimized and the memories can be effectively utilized.

According to a preferred embodiment of the present invention to attain the above objects, an edge list constructor comprises a calculation means for advance calculation of f(K), which is the number of intersections made by a horizontal straight line whose Y value equals K and an edge of an m-polygon, the m-polygon being formed by m segments (edges) ending at two adjacent vertex elements (Xn, Yn) as the starting point and (Xn+1, Yn+1) as the terminating point and being defined by a coordinate point sequence {Xn, Yn} (where m is a natural number not less than 3, n is a natural number not more than m, Xm+1=X1 and Ym+1=Y1) on the two dimensional X-Y plane, the point sequence comprising the points {X1, X2 ... Xm, Y1, Y2 ... Ym}, and the greatest and the smallest Y coordinate values among the elements in the coordinate vertex sequence {Xn, Yn} being Ymax and Ymin respectively and K being an integer not less than Ymin but not more than Ymax; a generation means to generate edge list elements including the coordinate of intersections made by an edge of the polygon and the horizontal straight line where Y=K and the plus or minus sign for the outer product of that intersection in the order where all the edges of the m-polygon are traced in one direction along the edges; a storage means to store edge list elements generated by the generation means; and a storage processing means to store, during the process of storing edge list elements serially generated by the generation means to the storage means, an edge list elements at a location apart from the location where the previous edge list element whose Y equals K has been stored by f(K) calculated by the calculation means.

According to a preferred embodiment, an edge list constructor further comprises a means to obtain Y coordinate sequence for the maximum and minimum vertexes from the coordinate vertex sequence {Xn, Yn} and a second storage means to store the obtained Y coordinate sequence.

According to another preferred embodiment, an edge list constructor further comprises a third storage means to store the coordinate vertex sequence {Xn, Yn} and a fourth storage means to store the storage location in the third storage means for the vertexes having the greatest or smallest Y coordinate values among the maximum or minimum vertexes stored in the second storage means and is characterized by that the edge list element generation means refers to the storage location for the greatest or smallest vertexes stored in the fourth storage means and reads out the greatest or smallest vertexes from the coordinate vertex sequence stored in the third storage means so as to start edge list element generation.

According to still another preferred embodiment, an edge list constructor further comprises a means to determine the number of edge list elements constituting each edge based on the absolute value of the difference between the coordinate values of the starting and terminating points (vertexes) for each edge of the m-polygon.

According to further preferred embodiment, the calculation means for advance calculation of f(k), which is the number of intersections made by an edge of m-polygon and the horizontal straight line with Y equaling K, uses a recursion formula $f(K)=f(K+1)+2\times(P-Q)$ to determine the f(K), where P is the number of maximum points existing on the horizontal straight line with $Y=K$ and Q is the number of minimum points on that line.

BRIEF DESCRIPTION OF THE DRAWINGS

FIG. 7 is a diagram to show the status of the edge list on the memory not yet sorted;

FIG. 8 is a diagram to show the status of the edge list on the memory after sorting;

FIGS. 9A-9B are the diagrams to show the status of the edge list considering the maximum and minimum points;

DESCRIPTION OF THE PREFERRED EMBODIMENT

Referring to the attached figures, a preferred embodiment of an edge list constructor according to the present invention will be described below.

Figure 1:
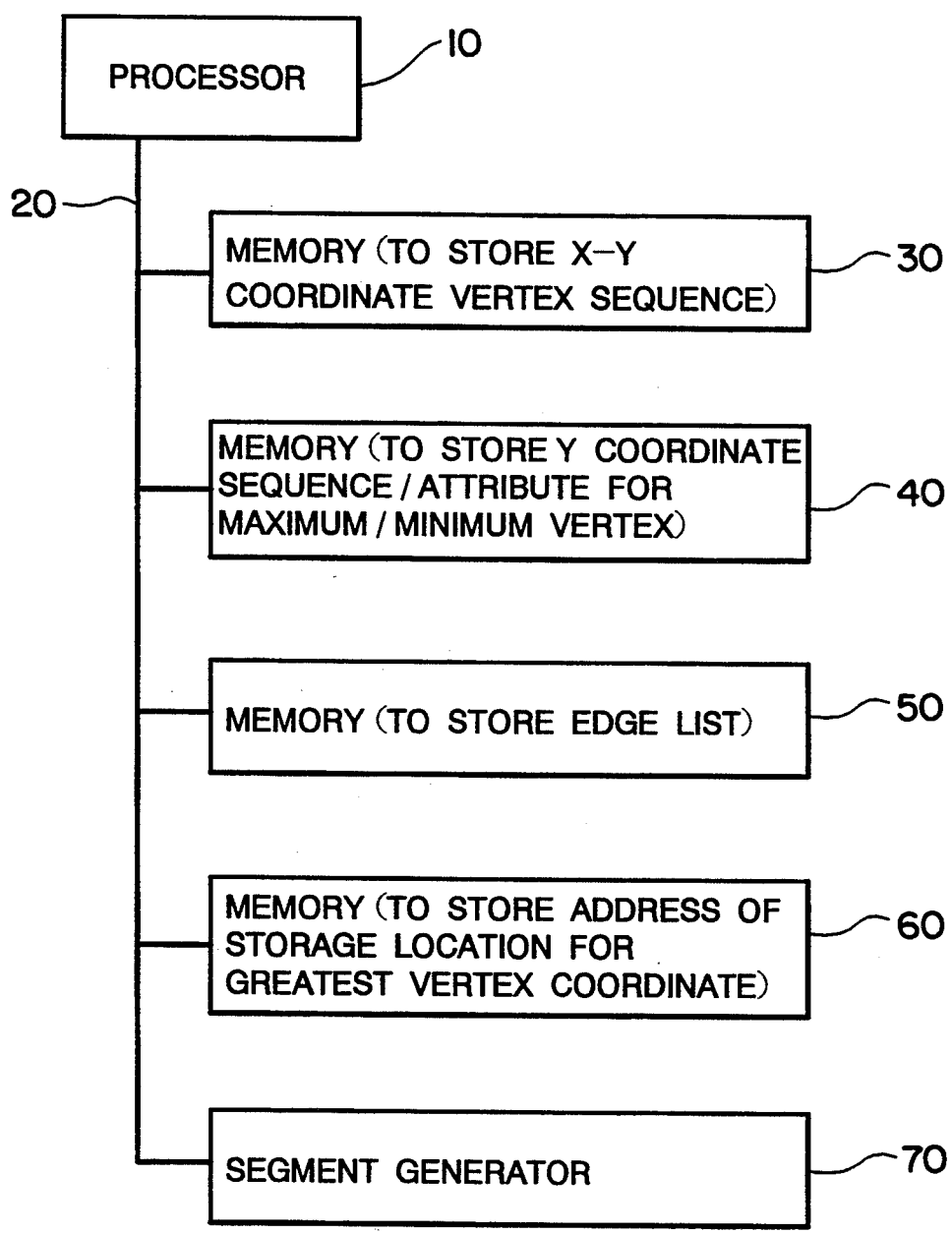
FIG. 1 is a block diagram to show the configuration of an edge list constructor according to an embodiment of the present invention.

FIG. 1 is a block diagram to show the configuration of an edge list constructor according to an embodiment of the present invention. This edge list constructor consists of a processor 10, a memory 30 to store X-Y coordinate vertex sequence, a memory 40 to store Y coordinate sequence and attribute for maximum or minimum vertex, a memory 50 to store edge list, a memory 60 to store the address of the storage location for the greatest vertex coordinate, which has the greatest Y coordinate among the coordinate vertex sequence stored in the X-Y coordinate vertex sequence storage memory 30, a segment generator 70 comprising a DDA (Digital Differential Analyzer) and a bus 20 to connect the blocks.

The processor (microprocessor) 10 is capable of reading/writing for unit storage device at an arbitrary location in these memories and reading/writing of data for the segment generator 70. The processor 10 serves for various operations applicable to two or more read out data, such as addition, subtraction, size comparison, and result writing to the memory. When coordinates of starting and ending points of a segment are given, the segment generator 70 serially generates coordinate values of micro-points, which are components of the approximate segment connecting the two points, and writes them in the edge list storage memory 50. The coordinate values of micro-points are written together with the direction vector sign of the segment as attribute. The sign of the direction vector is + when the Y coordinate of the segment starting point is larger than that of the ending point and − when the Y coordinate of the segment starting point is smaller then that of the ending point. This sign serves as the value Wn used for increase or decrease of the winding number.

The present invention is characterized by its configuration as shown in FIG. 1. It is now supposed that, among the elements of the coordinate vertex sequence {Xn, Yn}, the greatest Y coordinate value is Ymax, the smallest Y coordinate value is Ymin, K is an integer not less than Ymin but not more than Y max. The constructor according to the present invention is provided with a processor 10 as the first component to calculate in advance the value f(K), which is the number of intersections made by an edge of the polygon and the horizontal straight line with Y=K, a segment generator 7 as the second component to generate the edge list elements comprising the coordinates and the signs Wn of the intersections made by a polygon edge and the horizontal straight line with Y=K in the order where all the polygon edges are traced in one direction along the edges, an edge list storage memory 50 as the third components to store the edge list elements generated by the segment generator 70, and a processor 10 as the fourth component to store the next edge list element at the location apart from the previous edge list element storage location for Y=K by f(K) determined by the segment generator 70 during the storage process where edge list elements serially generated by the segment generator 70 are stored to the edge list storage memory 50.

Figure 2:
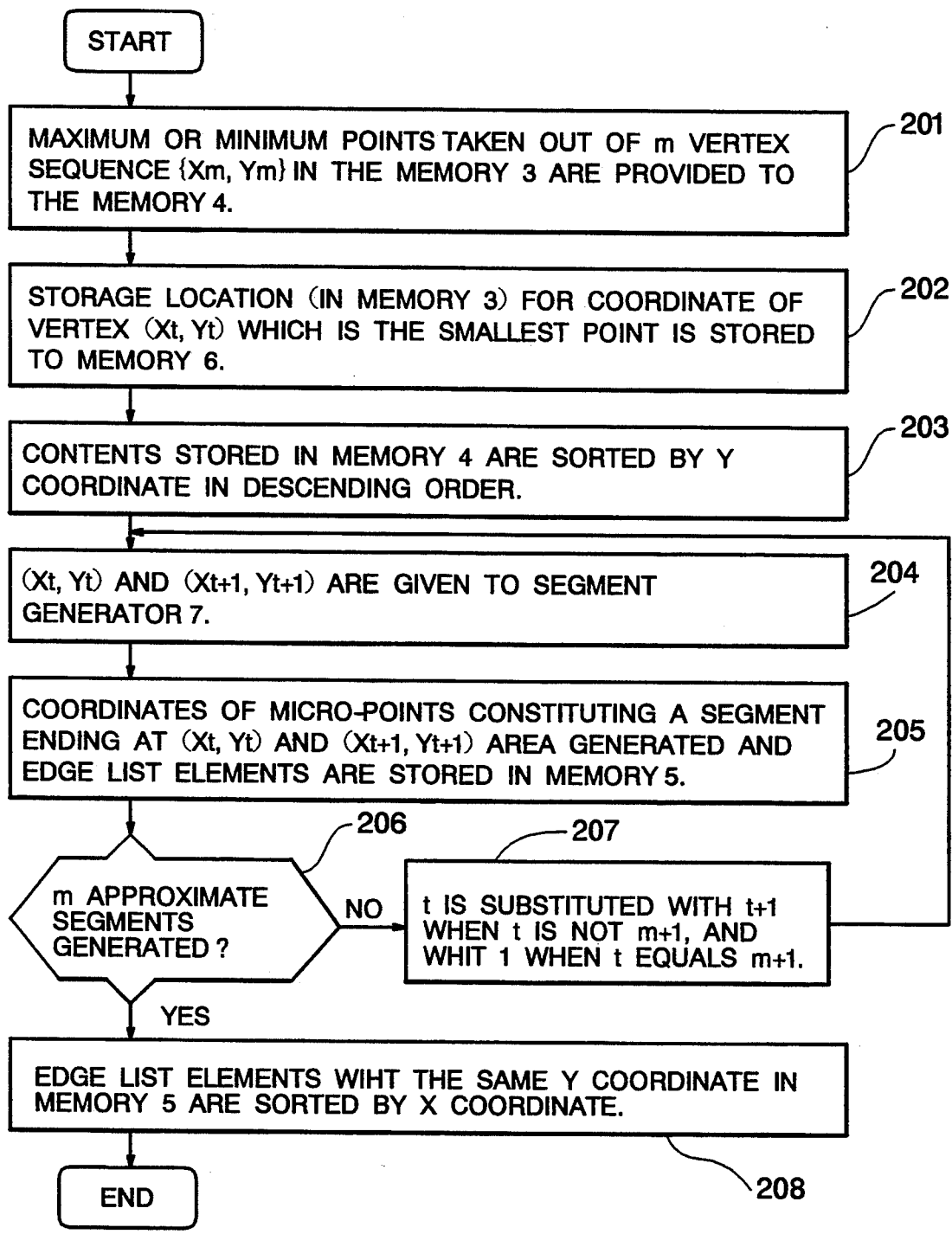
FIG. 2 is a flowchart to illustrate the operation of edge list generation by the edge list constructor shown in FIG. 1.
Figure 3:
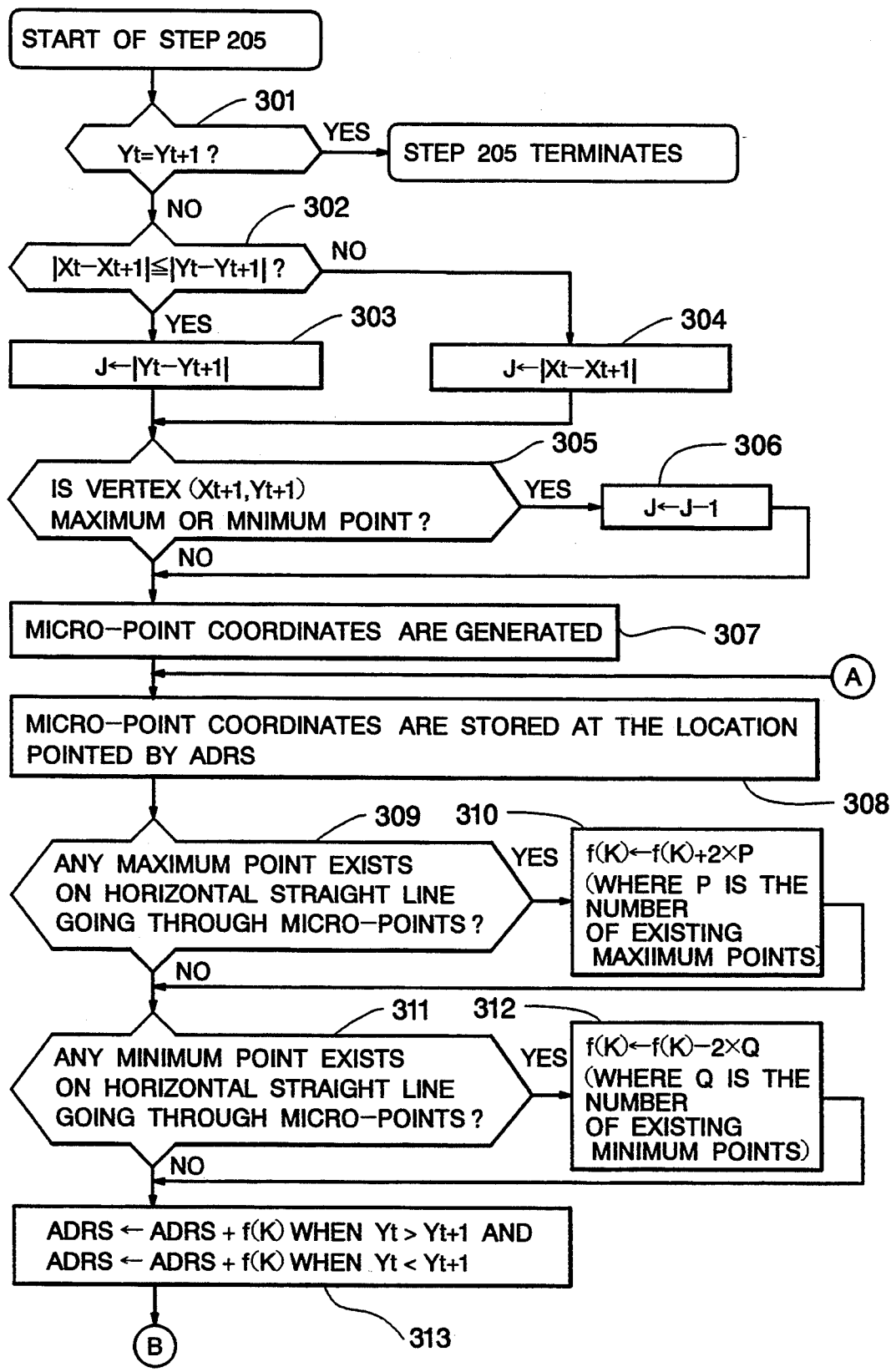
FIG. 3 is a flowchart to show the details of the processing shown in the flowchart of FIG. 2.
Figure 4:
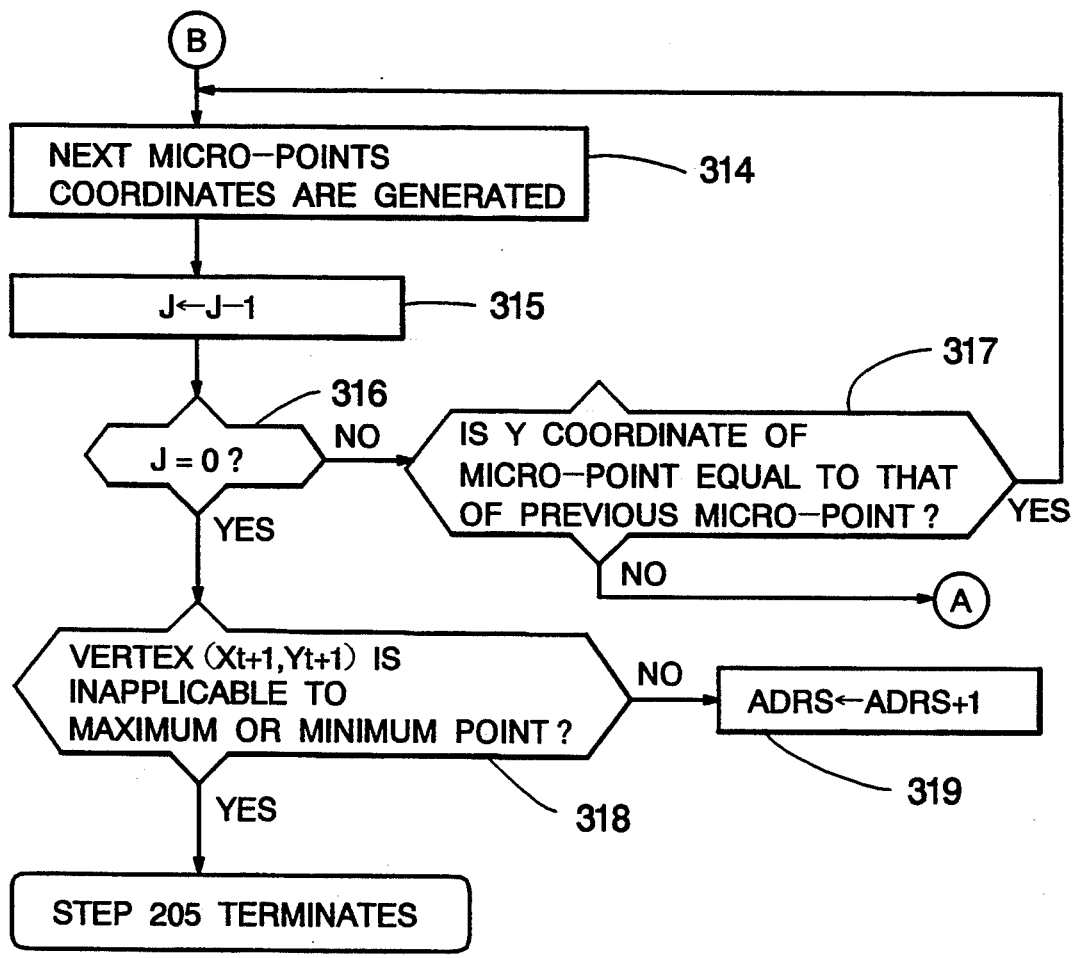
FIG. 4 is a flowchart to show the details of the processing shown in the flowchart of FIG. 2.

Next, referring to the flowcharts in FIGS. 2, 3, and 4, the operation of an edge list constructor according to this embodiment is described now. FIG. 2 shows the operation of the whole system, FIG. 3 indicates the first half of the procedure in Step S4 in FIG. 2 and FIG. 4 shows the second half of the procedure in Step S4 in FIG. 2.

Suppose X-Y coordinate vertex sequence {Xn, Yn} is in the memory 30 at the start point of the flowchart shown in FIG. 2. The sequence {Xn, Yn} defines an m-polygon having as edges m segments starting and ending at its two adjacent elements (Xn, Yn) and (Xn+1, Yn+1), where m is a natural number not less than 3, n is a natural number not more than m, and Xm+1=X1 and Ym+1=Y1.

The processor 10 first creates a Y coordinate sequence of vertexes for maximum or minimum value on the Y axis (for Y coordinate values) based on the X-Y coordinate vertex sequence {Xn, Yn} stored in the memory 30 and stores it to the memory 40 (Step 201). Whether a vertex (Xn, Yn) is the maximum point or minimum point or neither of them for the Y axis is judged by comparing Y coordinate values of three adjacent vertexes: Yn−1, Yn and Yn+1. If Yn−1<Yn->Yn+1, the vertex (Xn, Yn) is the maximum point; if Yn−1>Yn<Yn+1, the vertex (Xn, Yn) is the minimum point. If Yn−1=Yn, coordinate values are compared between Yn and Yn−2 as well as between Yn and Yn−3. Similarly, if Yn=Yn+1, coordinate values are compared between Yn and Yn+2 and Yn and Yn+3. By such comparisons with n=1, 2, 3, ..., m, a Y coordinate sequence for the maximum or minimum vertexes can be obtained. The vertex with the greatest Y coordinate value (maximum point (Xk, Yk)) indicated in this sequence is checked so that its storage position in the memory 30 (the address pointer indicating the location of the vertex in the memory 30) is stored to the memory 60 (Step 202). Then, the coordinate values of the maximum and minimum vertexes stored in the memory 40 are sorted in descending order according to the Y coordinate value (Step 203).

Next, the processor 1 reads the coordinate vertexes (Xt, Yt) and (Xt+1, Yt+1) out of the X-Y coordinate vertex sequence {Xn, Yn} stored in the memory 30 and gives it to the segment generator 7 (Step 204). This reading is started from the greatest coordinate vertex by referring to the maximum vertex storage location in the memory 30 stored in the memory 60.

The segment generator 7 generates coordinates of micro-points constituting an approximate segment ending at (Xt, Yt) and (Xt+1, Yt+1) and stores them as edge list elements in the edge list storage memory 50 (Step 205). At this point, the storage locations of the micro-point coordinates for the approximate segment are determined by reference to the contents in the memory 40. Specifically, a coordinate is stored at a location apart from the previous coordinate storage location by f(K).

Upon completing generation of coordinates for the segment ending at (Xt, Yt) and (Xt+1, Yt+1) in Step 205, the processor 1 judges whether coordinates for m approximate segments have been generated or not (Step 206). If not, the procedures from Step 204 are repeated with substituting t+1 for t when t is not m+1 and 1 for t when t equals m+1. Specifically, after completing generation of coordinates for the segment ending at (Xt, Yt) and (Xt+1, Yt+1), the processor 10 reads the coordinate vertexes (Xt+1, Yt+1) and (Xt+2, Yt+2) out of the memory 30 and provide them to the segment generator 70. The segment generator 70 generates the coordinates for the segment ending at (Xt+1, Yt+1) and (Xt+2, Yt+2) and similarly stores them as edge list elements in the memory 50 (Steps 204 and 205). Thus, such generation is serially repeated until the generation for the segment ending at (Xm−1, Ym−1) and (Xm, Ym) is completed. Then, an approximate segment ending at (Xm, Ym) and (X1, Y1) returning to the first element of the coordinate vertex sequence. Similarly, approximate segments are serially generated starting from the one ending at (X1, Y1) and (X2, Y2), proceeding to another segment ending at (X2, Y2) and (X3, Y3) and so on. Thus, the procedures from Step 204 are repeated until m segments have been generated with the last segment ending at (Xt−1, Yt−1) and (Xt, Yt) (Step 206). When m segments have been generated, the edge list sorted by Y coordinate value has been completed in the memory 50.

Finally, the elements with the same Y coordinate in the edge list in the edge list storage memory 50 are sorted by X coordinate (Step 208). The edge list sorted by Y and X coordinate values is now completed in the edge list storage memory 50.

Referring now to FIGS. 3 and 4, processing in Step 205 in the flowchart of FIG. 2, which characterizes the present invention, is described in detail. With referring to the address pointer indicating the location where edge list elements are to be stored in the edge list storage memory 50 as address ADRS, change of the address ADRS and f(K) value is described below.

At the start of Step 205, the address ADRS is supposed to indicate the storage location for the element to be stored next. Also suppose f(K)=0 when the first segment is generated and thereafter, f(K) value at the previous segment generation is always kept as it is until the next segment generation.

Before generating coordinates of micro-points, the number of coordinate generations for micro-points J is to be determined for each edge of the m-polygon. The number of coordinate generations J represents the number of micro-points constituting the segment. Steps 301 to 306 in FIG. 3 show the procedures to determine J, the number of coordinate generations for micro-points. In Step 301, Y coordinate values Yt and Yt+1 read from the X-Y coordinate vertex sequence {Xn, Yn} are compared. When they are equal, the processing of Step 205 is terminated. In other words, the horizontal segments where Yt equals Yt+1 (an edge parallel with the X axis of m-polygon) are excluded from the edge list.

In Step 302, the absolute values of $Xt-Xt+1$ and that of $Yt-Yt+1$ are compared so as to judge whether $|Xt-Xt+1|$ is equal to or smaller than $|Yt-Yt+1|$. If so, $|Yt-Yt+1|$ is the number of coordinate generations J (Step 303). If not, $|Xt-Xt+1|$ is the number of coordinate generations J (Step 304).

Step 305 is the processing when the vertex $(Xt+1, Yt+1)$ is the maximum or minimum point (i.e. to prevent the number of edge list elements from being odd). If the vertex $(Xt+1, Yt+1)$ is not maximum or minimum point, the number of coordinate generations J determined in Step 302 or 303 is used as it is. When the vertex $(Xt+1, Yt+1)$ is the maximum or minimum point, however, the value determined in Step 302 or 303 minus 1 is the number of coordinate generations J to be used (Step 306).

After determining the number of coordinate generations J in Steps 301 to 306, a micro-point is generated (Step 307) and stored as an edge list element in the edge list storage memory 50 at the location indicated by the address ADRS in Step 308.

The procedures of Steps 309, 310, 311 and 312 determine the number of edge list elements f(K) relating to the horizontal straight line where $Y=K$. Specifically, the number of edge list elements f(K) is determined by executing the following recursion formula:

$$f(K)=f(K+1)+2\times(P-Q) \text{ or}$$

$$f(K)=f(K-1)+2\times(P-Q),$$

where P is the number of maximum points existing on the horizontal straight line where $Y=K$ and Q is the number of minimum points on that line. Steps 309 and 310 determined f(K) when the maximum point exists on the horizontal straight line and Steps 311 and 312 determines f(K) when the minimum point exists on that line.

In Step 313, the address ADRS is updated so as to provide an empty area for storing $(f(K)-1)$ elements between two edge list elements. In short, f(K) is added when $Yt>Yt+1$, but f(K) is subtracted when $Yt<Yt+1$ so that the address ADRS is updated.

Steps 314, 315, 316, and 317 in FIG. 4 represent the processing for another micro-point. The coordinate for the next micro-point is generated in Step 314 and the number of coordinate generations J is decreased by 1 in Step 315.

Figures 5, 6A, 6B, 6C:
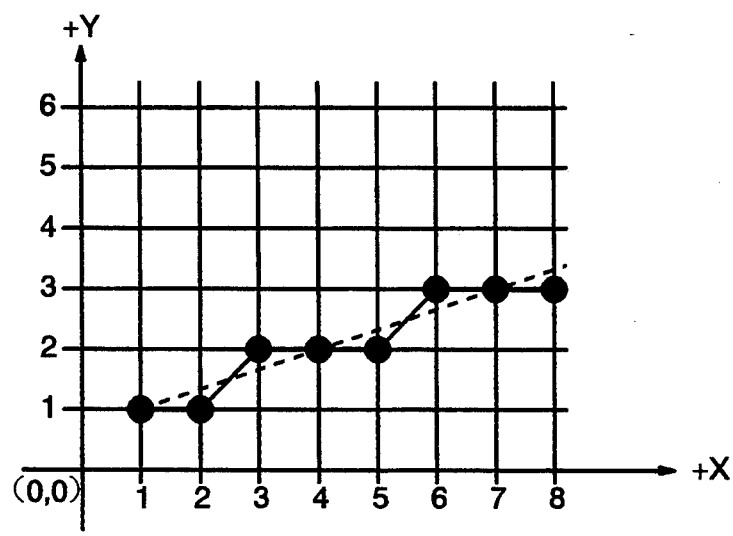
FIG. 5 is a diagram to show an example of an approximate segment with inclination of 0 (inclusive) to 45 (exclusive) degrees in relation to the X axis.
FIGS. 6A-6C are the digrams to show the process where edge list elements are stored in the memory.

In Step 316, whether the number of coordinate generations J is zero or not is judged. It is not zero, the system proceeds to the processing in Step 317. The processing in Step 317 serves for preventing one edge (approximate segment) from intersecting a horizontal straight line more than once. If the inclination of an approximate segment is in the range of $-45$ to $+45$ degrees in relation to the X axis (in $+X$ direction), the approximate segment intersects a single horizontal straight line twice or more. FIG. 5 shows such a situation. The approximate segment in FIG. 5 intersects the horizontal segment where $Y=2$ at three coordinate points (3,2), (4,2), and (5,2). This is because the edge (approximate segment) is approximated as a segment in the integer coordinate system.

When the number of coordinate generations J is zero in Step 316, whether the vertex $(Xt+1, Yt+1)$ is the maximum/minimum point or not in Step 318. If not, the processing of Step 205 is terminated. If it is the maximum or minimum point, then the address ADRS is increased by 1 (Step 319) before termination of Step 205 processing. The address is thus shifted by 1 in Steps 318 and 319 because, when the vertex $(Xt+1, Yt+1)$ is the maximum or minimum point, the direction of address change becomes reverse at the next edge list element storing for a segment starting at this vertex $(Xt+1, Yt+1)$. For example, in FIG. 6 described later, the address in the increasing direction in FIG. 6B changes its direction in FIG. 6C so as to be in the decreasing direction. The memory 50 in FIG. 6 arranges the address values so that lower placed values are larger. When the address is shifted by 1 (by f(K) value), the edge list as in FIG. 6C is stored.

Now, a specific example is described.

In the present invention, approximate segments are generated so that the edges of a polygon are traced in one direction along the edges. Accordingly, it is sufficient to provide one segment generator 70 (DDA). For a specific example shown in FIG. 10B, the edge list is constructed in the order given in FIG. 7. However, if edge list elements generated are sequentially stored in the edge list storage memory 50 as they are, it will take time for sorting as described above. To solve this problem, edge list elements generated are stored in the edge list storage memory 50 while considering the address offset of f(K), which is the number of edge list elements recognized in advance for the horizontal straight line where $Y=K$. This storage method is described below according to an example of a triangle shown in FIG. 10B.

Figure 10A:
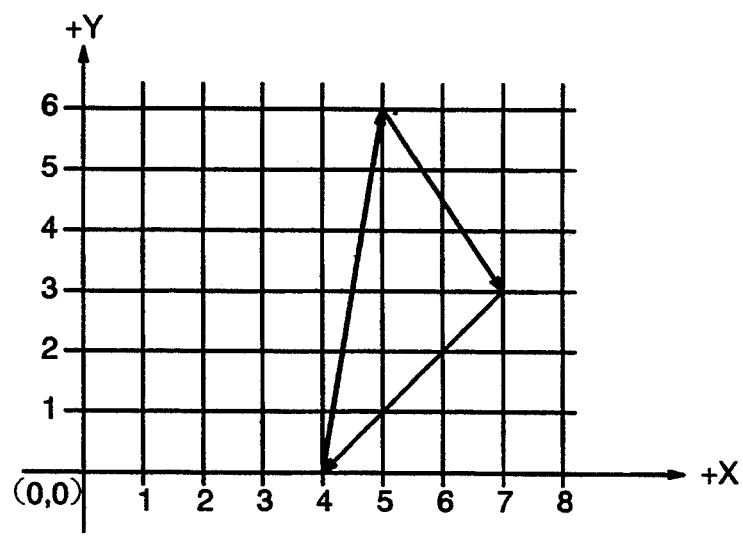
FIGS. 10A-10B are the diagrams to show a triangle drawn on the X-Y coordinate plane and its mapped contents on the integer coordinate system.
Figure 10B:
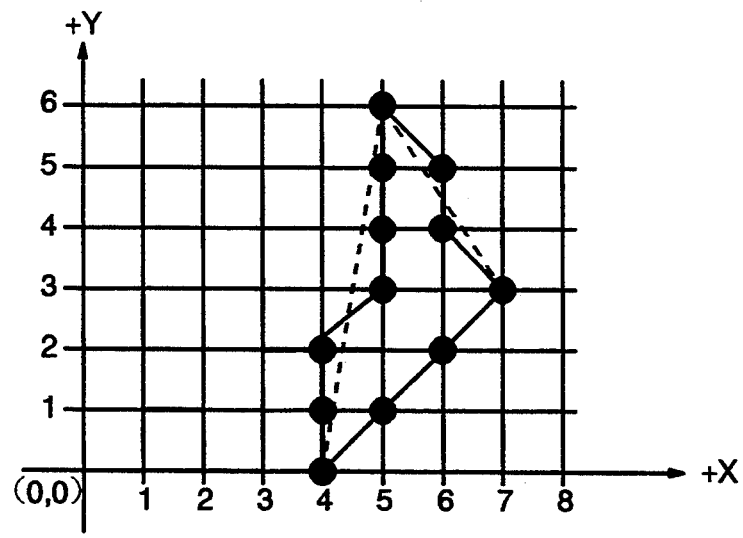
Figure 11:
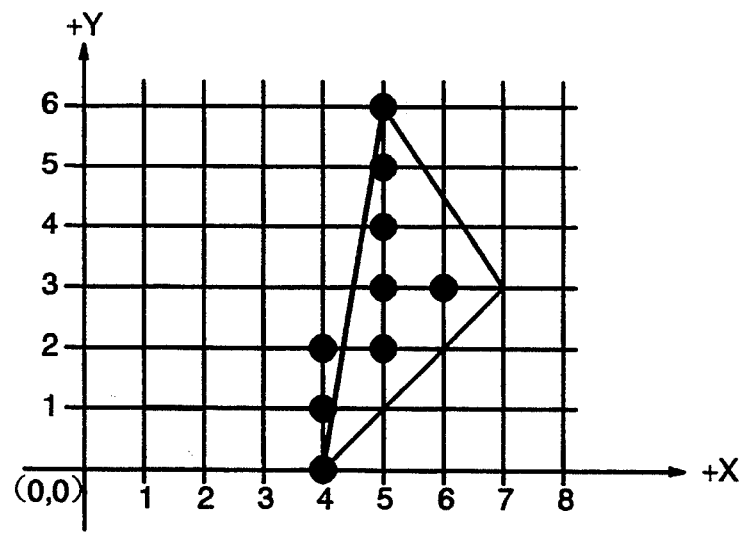
FIG. 11 is a diagram to show a model where the coordinate points belonging to the inside area of the triangle of FIG. 10 are painted.

The edge list required for area judgment of the triangle in FIG. 10B is the one given as FIG. 9A or 9B. In other words, it is the edge list subjected to sorting by Y coordinate and then by X coordinate.

FIGS. 6A, 6B and 6C show the process where the edge list is stored in the edge list storage memory 50. FIG. 6A shows the status of the edge list storage memory 50 immediately after generation of the approximate segment from the vertex (5,6) (greatest point) to the vertex (7,3). The memory 50 stores three elements here: (5,6,−), (6,5,−) and (6,4,−). The vertex (7,3) is not included in the list because it is not a maximum or minimum point. For horizontal straight lines where $Y=6, 5$ and 4, the above three elements (5,6,−), (6,5,−) and (6,4,−) can be stored in the edge list storage memory 50 with intervals of one address as shown in FIG. 6A, if it is known in advance that there exists two elements for each line. The method to determine how many elements exists on the horizontal straight line where $Y=K$ will be described later.

FIG. 6B shows the status of the edge list storage memory 50 immediately after generation of the approximate segment from the vertex (7,3) to the vertex (4,0). It stores four elements: (7,3,−), (6,2,−), (5,1,−) and (4,0,−). There elements are stored below (6,4,−), which is a component of the approximate segment from the vertex (5,6) (greatest point) to the vertex (7,3), with intervals of one address.

Finally, FIG. 6C shows the status of the edge list storage memory 50 immediately after generation of the approximate segment from the vertex (4,0) to the vertex (5,6). Since the drawing direction of the approximate segment from vertex (4,0) to (5,6) goes toward larger Y coordinate values, elements are to be stored in the direction reverse to that in the edge list storing for the approximate segment from (5,6) (greatest point) to (7,3) or the approximate segment from (7,3) to (4,0) (upward in the figure). The seven elements stored here are: (4,0,+), (4,1,+), (4,2,+), (5,3,+), (5,4,+), (5,5,+) and (5,6,+).

Since the elements obtained from generating an approximate segment from vertex (5,6) (greatest point) to vertex (7,3) and another approximate segment from (7,3) to (4,0) are stored with intervals of one address leaving some empty areas (FIG. 6 (b)), the above seven elements (4,0,+), (4,1,+), (4,2,+), (5,3,+), (5,4,+), (5,5,+) and (5,6,+) are stored to these empty areas.

FIG. 6C shows the status when generation of three approximate segments forming a triangle is completed. Sorting by Y coordinate has been already completed, or sorting time for Y coordinate is zero. In addition, there is no excessive empty areas in the edge list storage memory 50.

Here, the method to check in advance the number of elements relating to a horizontal straight line where $Y = K$ is described. Basically, it is sufficient to analyze Y coordinate values for maximum and minimum points of the polygon. Suppose the number of elements in relation to the horizontal straight line where $Y = K$ is $f(K)$. If the number of elements in relation to the horizontal straight line where $Y = K+1$ is $f(K+1)$, then the number of elements $f(K)$ in relation to the horizontal straight line where $Y = K$, which is located thereunder, can be expressed with the recursion formula as follows:

$$f(K) = f(K+1) + 2 \times (P-Q)$$

where P is the number of maximum points and Q is the number of minimum points both on the horizontal straight line with $Y = K$.

The defined area of K can be learned by searching the polygon vertex sequence for the largest and smallest Y coordinate values.

Figure 12A:
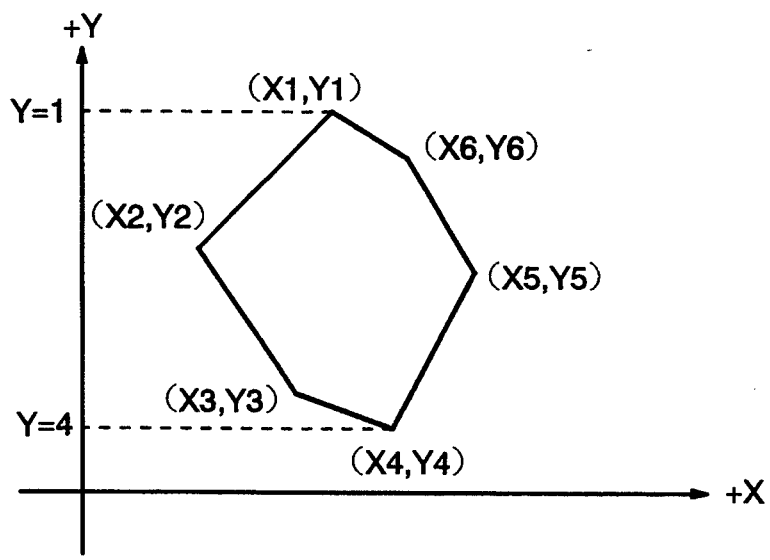
FIGS. 12A-12B are the diagrams to show an example of a polygon having three maximum points and three minimum points.
Figure 12B:
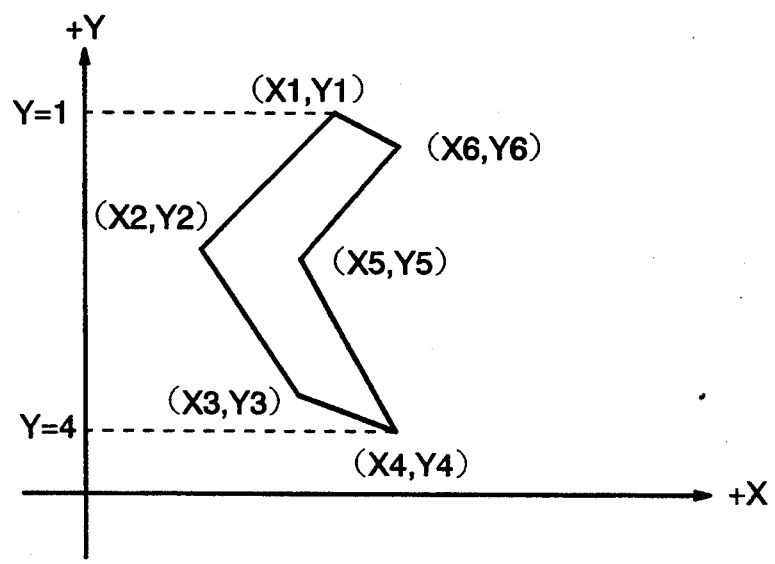

Referring to FIGS. 12A, 12B, 13A and 13B, other specific examples are described below. A projecting polygon as shown in FIGS. 12A and 12B has only one maximum point (X1, Y1) and only one minimum point (X4, Y4). (X1, Y1) is the maximum point and at the same time the greatest point. (X4, Y4) is the minimum point and at the same time the smallest point. Accordingly, there is no element in relation to a horizontal straight line where $K > Y1$ or $K < Y4$. We can focus on the horizontal straight lines in the range where $Y4 < K < Y1$. Firstly, since there is a maximum point on the horizontal straight line where $K = Y1$, $f(Y1) = 2$. When decreasing the value of K one by one for Y1, Y1−1, Y1−2, Y1−3, ... Y4+3, Y4+2, Y4+1, we cannot find any maximum or minimum point until $Y = Y4+1$. Accordingly, $f(K) = 2$ ($K = Y1$, Y1−1, Y1−2, Y1−3, ..., Y4+3, Y4+2, Y4+1). Since there exists a minimum point on the horizontal straight line where $Y = Y4$, $f(K) = 0$ here. This means that there is no element in relation to the horizontal straight line where $Y = Y4$. In other words, the vertex (X4, Y4) is deemed to be located outside of the figure. In the example in FIG. 10B, the vertex (4,0) of the triangle is not included in the edge list, and the edge list as shown in FIG. 9B is constructed. To construct the edge list in FIG. 9A, boundary conditions for area judgment applied to Y coordinate values can be changed. For example, to construct the edge list shown in FIG. 9A for a triangle shown in FIG. 10B, the above recursion formula "$f(K) = f(K+1) + 2 \times (P-Q)$ where P is the number of maximum points and Q is the number of minimum points on the horizontal straight line with $Y = K$" can be replaced with another recursion formula: "$f(k) = f(K+1) + 2 \times (P-Q)$ where P is the number of maximum point on the horizontal straight line with $Y = K$ and Q is the number of minimum points on the horizontal straight line with $Y = K+1$".

For convenience, we adopt here the former recursion formula $f(K) = f(K+1) + 2 \times (P-Q)$ where P is the number of maximum points and Q is the number of minimum points on the horizontal straight line with $Y = K$. This is equivalent to define that the maximum point is located inside and the minimum point is located outside of the polygon.

Figure 13A:
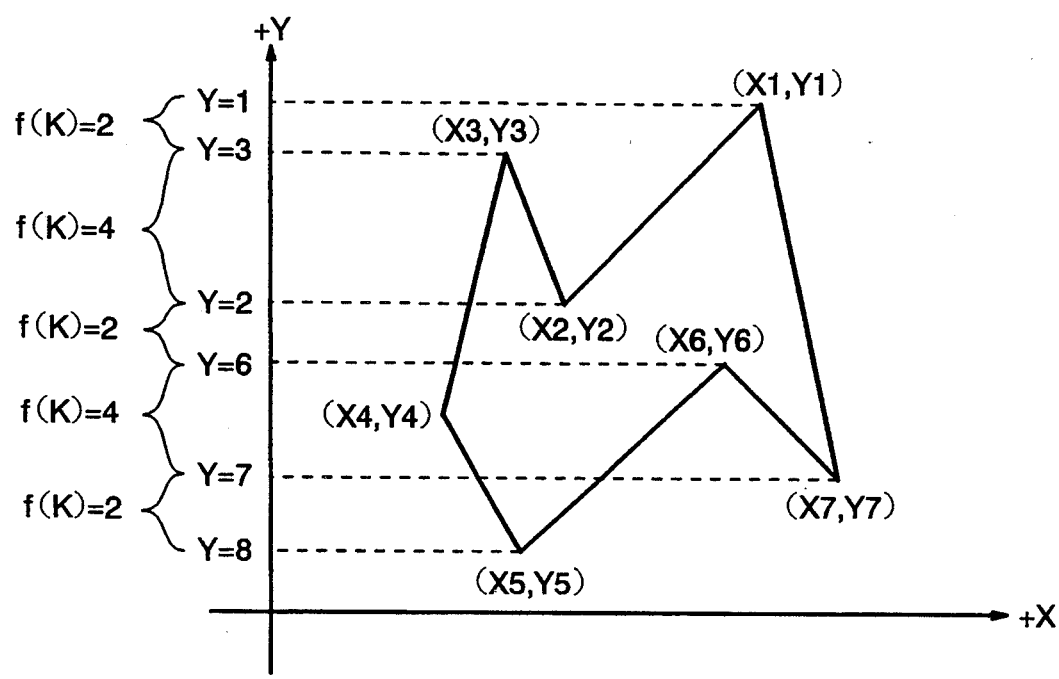
FIGS. 13A-13B are the diagrams to show an example of a polygon having two maximum points and two minimum points.

The change in $f(K)$ value for complicatedly shaped polygons is considered now. FIG. 13A shows a heptagon with three maximum points and three minimum points. (X1, Y1), (X3, Y3), and (X6, Y6) are maximum points and (X2, Y2), (X5, Y5) and (X7, Y7) are minimum points. When the value for K is decreased by 1 for Y1 to Y5, the $f(k)$ value is increased by 2 at Y1, Y3 and Y6 and decreased by 2 at Y2, Y5 and Y7. This coincides the results obtained from the recursion formula as described above.

Figure 13B:
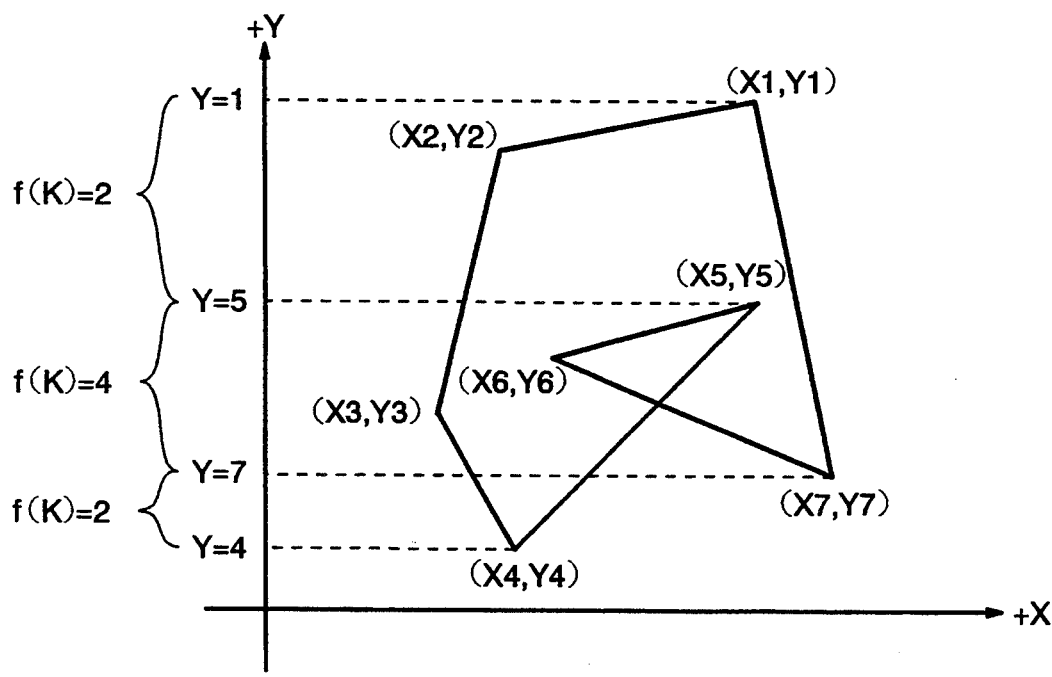

Now, the change in $f(K)$ value for more complicatedly shaped polygons is considered. FIG. 13B shows a heptagon with two maximum points and two minimum points having its edges intersecting each other. (X1, Y1) and (X5, Y5) are maximum points and (X4, Y4) and (X7, Y7) are minimum points. When the value for K is decreased by 1 for Y1 to Y4, the $f(k)$ value is increased by 2 at Y1 and Y5 and decreased by 2 at Y4 and Y7. This coincides the results obtained from the recursion formula as described above.

As shown by the description above, the edge list constructor according to this embodiment does not require any time for edge list sorting by Y coordinate. On the other hand, it requires some time for maximum/minimum judgment for a vertex of the polygon. However, the time required for this maximum/minimum point judgment is much shorter than that required for sorting by Y coordinate. This can be easily understood by observing shapes of typical polygons.

Figure 14A:
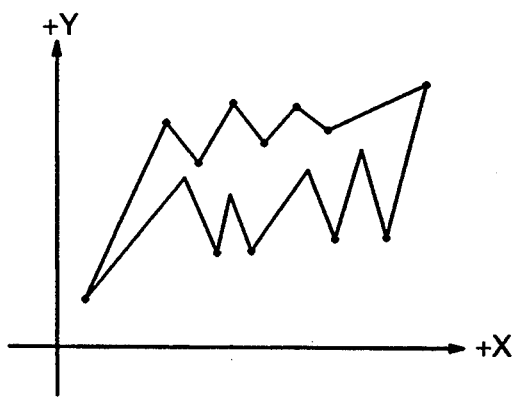
FIGS. 14A-14D are the explanatory views to show the relation between the typical shape of a polygon and its vertexes.
Figure 14B:
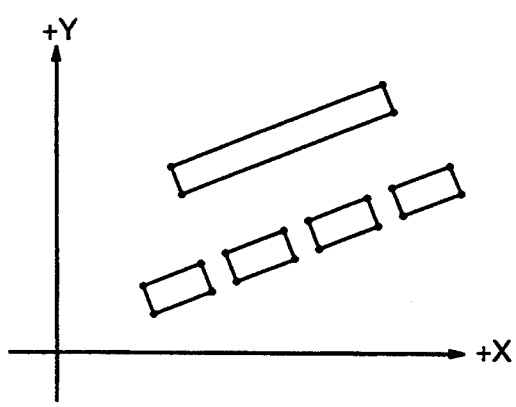

Suppose a typical polygon now. What is the percentage of vertexes which are not maximum or minimum point in all the vertexes of the polygon? It is quite rare that all vertexes are either maximum or minimum point as shown in FIG. 14A. Request to paint the whole area inside of such polygon can be made only in an interactive type software application, where the operator gives polygon vertexes using a pointing device such as a mouse. In this case, there are only a dozen of vertexes pointed and maximum/minimum judgment does not require so long time because of small number of vertexes. Another possible case is drawing of a thick solid or broken line as shown in FIG. 14B, where the contour of the thick line is given as a polygon. In this case, too, not so much time is required for maximum/minimum judgment because there are only a small number of vertexes.

Figure 14C:
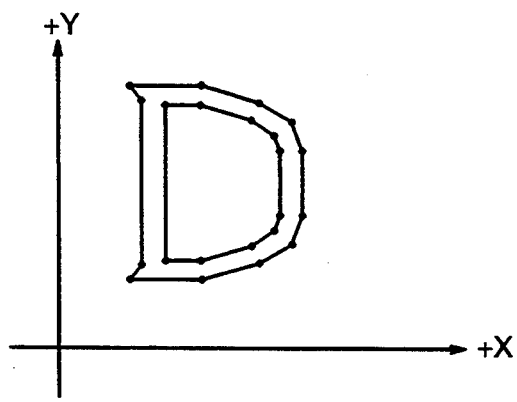
Figure 14D:
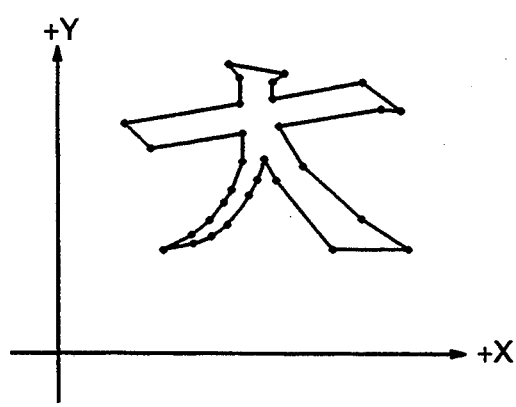

A large number of vertexes will be given in straight line approximation with treating curved lines as a set of subtle segments. Referring to FIGS. 14C and 14D, applications where the contour of a character is given as a polygon involve dozen (for alphanumeric characters) to some hundreds (for Chinese characters) of vertexes. In such cases, vertexes which are not maximum or minimum point represent 90% or more in the vertexes of the polygon. Accordingly, even is the polygon has some hundreds of vertexes, the number of those subjected to maximum/minimum judgment is only about a dozen. Therefore, the maximum/minimum judgment does not require so much time in such case, too.

Figure 15A:
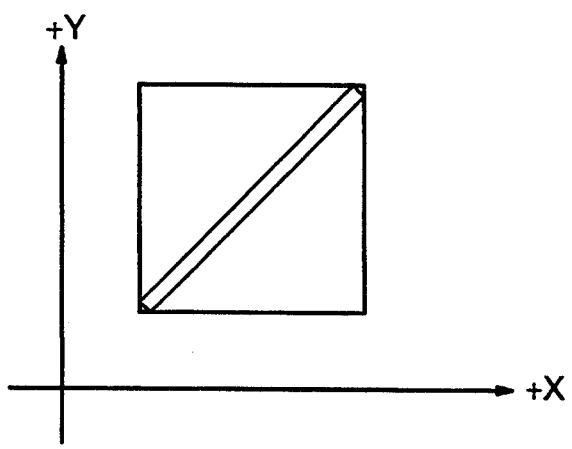
FIGS. 15A-15B are the diagrams to show the relation between a polygon and the minimum circumscribing rectangle enclosing the polygon.
Figure 15B:
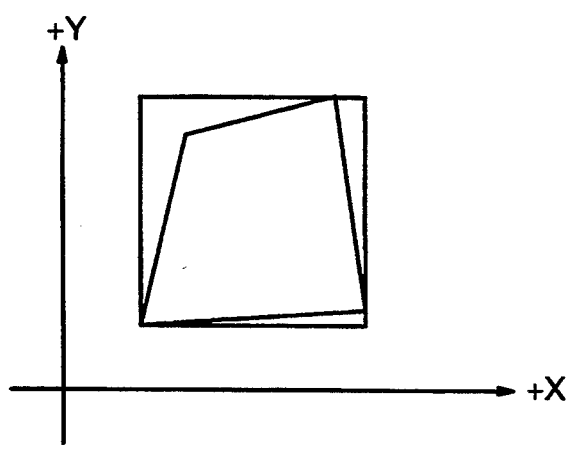
Figure 16A:
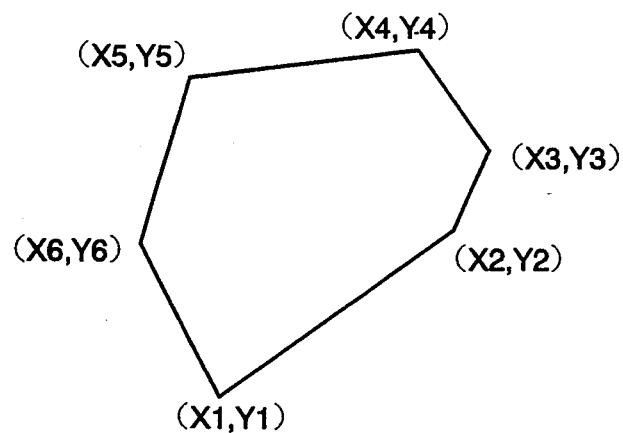
FIGS. 16A-16C are the diagrams to show the typical shape of a polygon.
Figure 16B:
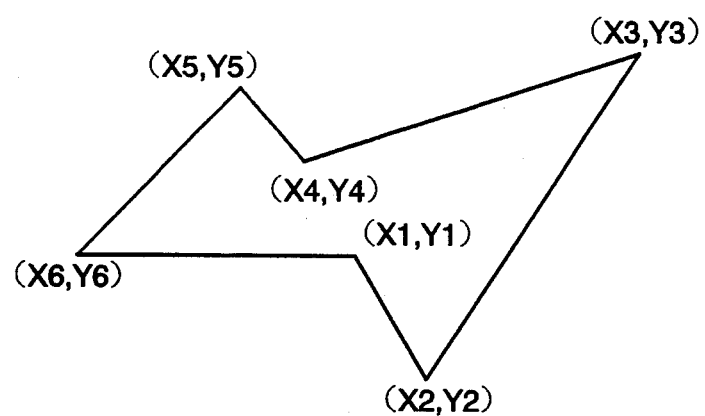
Figure 16C:
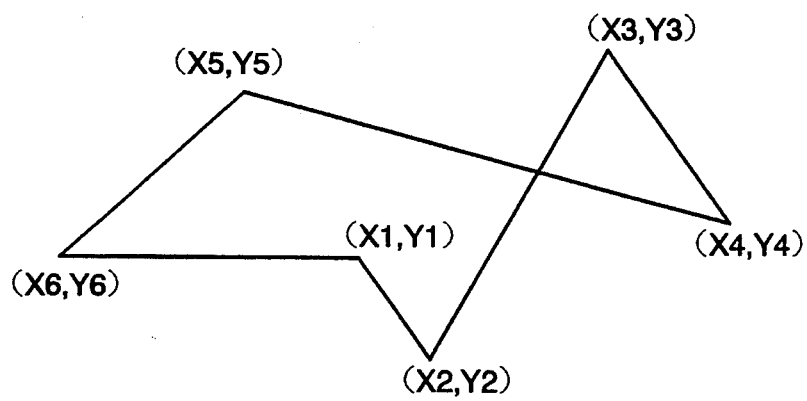
Figure 17:
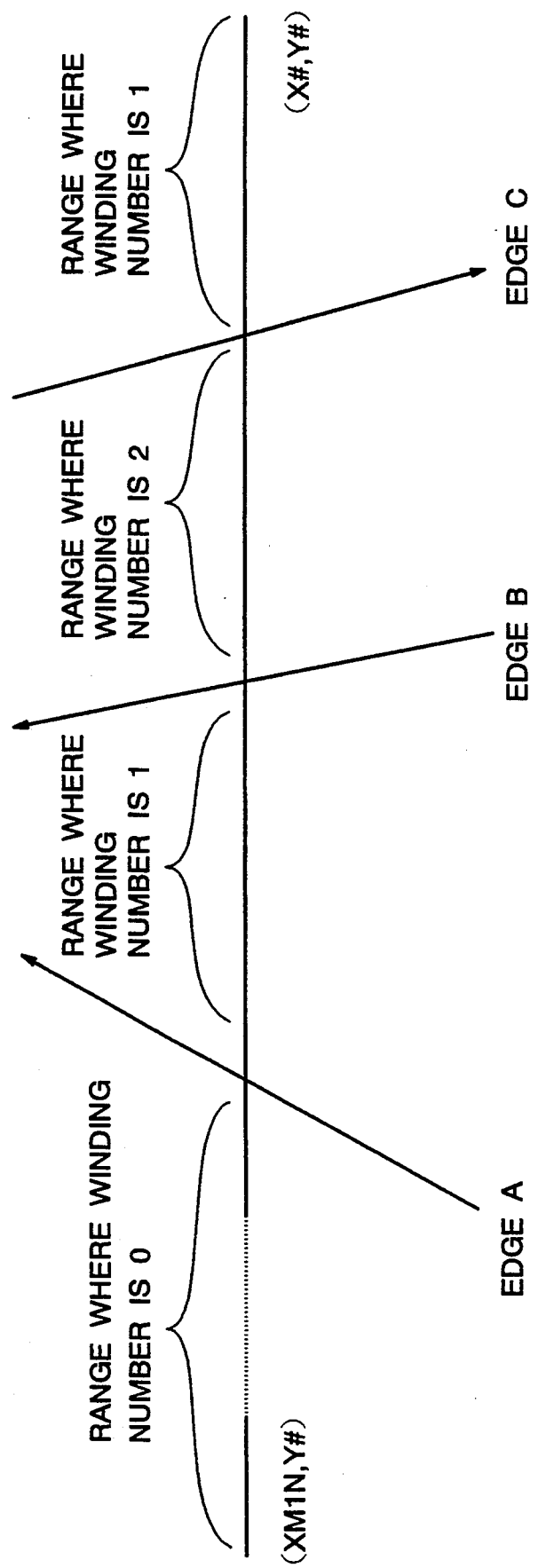
FIG. 17 is an explanatory view of the winding number for coordinate points.
Figure 18:
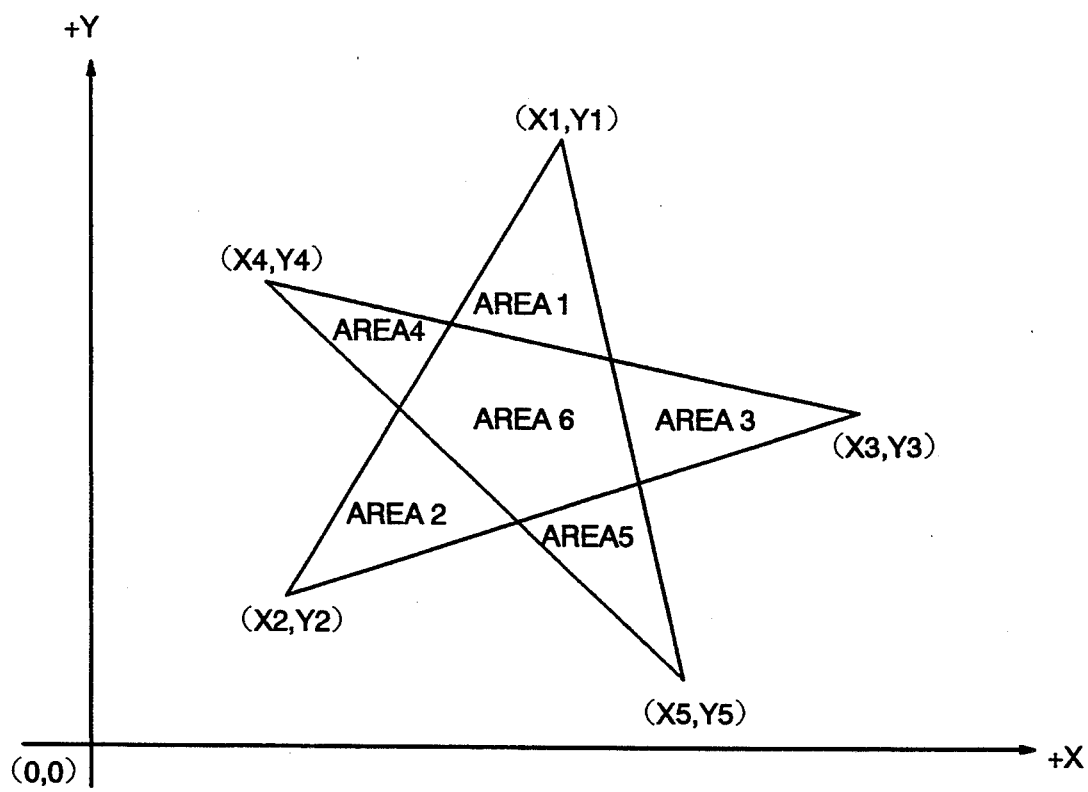
FIG. 18 is an explanatory view to show the painting rule for a polygon.

Note that maximum/minimum judgment is indispensable for any area judgment method other than that used in the present invention. To minimize the points to be subjected to the winding number judgment, the smallest circumscribing rectangle completely enclosing the polygons is supposed and the winding number is determined only for the points located inside of such circumscribing rectangle. FIGS. 15A and 15B show examples of such circumscribing rectangle. Supposing of a circumscribing rectangle is an effective means to reduce data to be processed. Accordingly, it is not necessary to consider the time required for maximum/minimum judgment in comparison of processing speed.

In the present embodiment, maximum/minimum judgment enables determination of the number of edge list elements, and therefrom the memory volume required as the edge lit storage area. When the horizontal straight line with the greatest point where Y=Kmax and the horizontal straight line with the smallest point where Y=Kmin are given, the total f(k) of the f(k) values in function with K can be determined, which represents the size of the edge list area. Therefore, a method where, upon completion of the maximum/minimum judgment, the system inquires usable memory capacity of other processing systems globally controlling the memories and then executes the edge list construction can be adopted. With this method, the constructor asks for an edge list storage memory 50 having necessary and sufficient capacity from other processing systems. This serves for effective utilization of memories, which are limited and important resources.

As described above, the present invention comprises a process where intersections made by a polygon edge and a horizontal straight line (edge list elements) are serially generated bases on the coordinate vertex sequence of the polygon so that the polygon edges are traced in one direction a long the edges and the edge list elements are stored in the memory, which eliminates the need of Y coordinate sorting by storing edge list elements at the locations apart from the previous edge list element storage locations (Y=K) by the number of edge list elements for Y=K, thereby improves the processing speed.

This invention also enables storing of edge list elements in continuous areas, which minimizing the memory capacity used for effective utilization of memories.

Further, this invention requires only one segment generator (DDA), which can simplify the whole device.

Obviously many modifications and variations of the present invention are possible. It is intended to cover in the appended claims all such modifications as fall within the true spirit and scope of the invention.

What is claimed is:

1. An edge list constructor comprising:

a calculation means for advance calculation of f(K), which is the number of intersections made by a horizontal straight line whose Y value equals K and an edge of an m-polygon, the m-polygon being formed by m segments (edges) ending at two adjacent vertex elements $(X_n, Y_n)$ as the starting point and $(X_{n+1}, Y_{n+1})$ as the terminating point and being defined by a coordinate vertex sequence $\{X_n, Y_n\}$ (where m is a natural number not less than 3, n is a natural number not more than m, $X_{m+1}=X_1$ and $Y_{m+1}=Y_1$) on the two-dimensional X-Y plane, and the greatest and the smallest Y coordinate values among the elements in said coordinate vertex sequence $\{X_n, Y_n\}$ being Ymax and Ymin, respectively, and K being an integer not less than Ymin but not more than Ymax;

a generation means to generate a plurality of edge list elements including coordinates of intersections made by an edge of said m-polygon and the horizontal straight line where Y=K and the plus or minus sign for the outer product of that intersection in the order where all the edges of said m-polygon are traced in one direction along the edges;

a storage means to store said edge list elements generated by said generation means; and a storage processing means to store, during the process of storing said edge list elements serially generated by said generation means to said storage means, each of said edge list elements at a location spaced apart from the location where the previous edge list element whose Y equals K has been stored, by f(K) calculated by said calculation means.

2. An edge list constructor of claim 1 further comprising a means to obtain a Y coordinate sequence for the maximum and minimum vertexes from said coordinate vertex sequence $\{X_n, Y_n\}$ and a second storage means to store the obtained Y coordinate sequence.

3. An edge list constructor of claim 2, further comprising a third storage means to store said coordinate vertex sequence $\{X_n, Y_n\}$ and a fourth storage means to store the storage location in said third storage means for the vertexes having the greatest or smallest Y coordinate values among the maximum or minimum vertexes stored in said second storage means, said edge list element generation means, referring to the storage location for the greatest or smallest vertexes stored in said fourth storage means and reading out the greatest or smallest vertexes from the coordinate vertex sequence stored in said third storage means so as to start edge list element generation.

4. An edge list constructor of claim 1 further comprising a means to determine the number of edge list elements constituting each edge based on the absolute value of the difference between the coordinate values of the starting and terminating points (vertexes) for each edge of said m-polygon.

5. An edge list constructor of claim 1 wherein said calculation means for advance calculation of f(k), which is the number of intersections made by an edge of m-polygon and the horizontal straight line with Y equaling K, uses a recursion formula $f(K)=f(K+1)+2\times(P-Q)$ to determine said f(K), where P is the number of maximum points existing on said horizontal straight line with Y=K and Q is the number of minimum points on that line.

* * * * *